United States Patent [19]
Devine, Jr.

[11] Patent Number: 4,700,882
[45] Date of Patent: Oct. 20, 1987

[54] COMPOSITE ROTARY ANODE FOR X-RAY TUBE AND PROCESS FOR PREPARING THE COMPOSITE

[75] Inventor: Thomas M. Devine, Jr., Scotia, N.Y.

[73] Assignee: General Electric Company, Schenectady, N.Y.

[21] Appl. No.: 918,455

[22] Filed: Oct. 14, 1986

Related U.S. Application Data

[62] Division of Ser. No. 702,160, Feb. 15, 1985, Pat. No. 4,641,334.

[51] Int. Cl.[4] ............ B23K 20/16
[52] U.S. Cl. ............ 228/194; 228/234; 228/263.12; 228/122
[58] Field of Search ............ 228/194, 263.12, 122, 228/123, 193, 234, 245

[56] References Cited

U.S. PATENT DOCUMENTS

| | | | |
|---|---|---|---|
| Re. 31,560 | 4/1984 | Devine, Jr. | 378/143 |
| Re. 31,568 | 4/1984 | Devine, Jr. | 378/143 |
| 3,651,562 | 3/1972 | Hambleton | 228/123 |
| 3,819,971 | 6/1975 | Kaplan et al. | 378/144 |
| 4,004,174 | 1/1977 | Yashiro | 378/144 |
| 4,276,493 | 6/1981 | Srinivasa et al. | 378/125 |
| 4,352,041 | 9/1982 | Hübner et al. | 378/127 |
| 4,360,142 | 11/1982 | Carpenter et al. | 228/123 |
| 4,597,095 | 6/1986 | Akpan | 378/143 |
| 4,641,334 | 2/1987 | Devine, Jr. | 378/144 |
| 4,645,121 | 2/1987 | Devine, Jr. | 228/194 |

FOREIGN PATENT DOCUMENTS 1383557 2/1975 United Kingdom .

*Primary Examiner*—Nicholas P. Godici
*Assistant Examiner*—Samuel M. Heinrich
*Attorney, Agent, or Firm*—Paul R. Webb, II; James C. Davis, Jr.

[57] ABSTRACT

A method for the diffusion bonding of a graphite member to a metallic surface as part of a composite rotary anode for an X-ray tube is set forth. In the completed structure a compound laminate separating and metallurgically bonded to the graphite member and to the metallic surface consists of, in sequence, a layer comprising carbide of vanadium and of a metal selected from the group consisting of of molybdenum and tungsten, a layer of metal selected from the group consisting of vanadium and vanadium alloys, a zone of interdiffused metals comprising platinum and vanadium and then a continuous layer comprising platinum or platinum alloy.

17 Claims, 4 Drawing Figures

FIG. 3
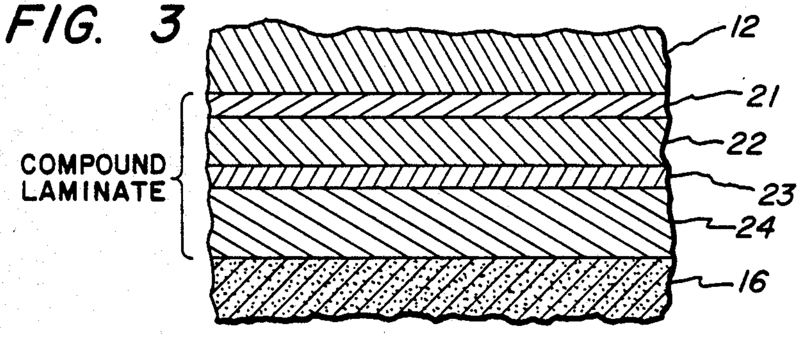
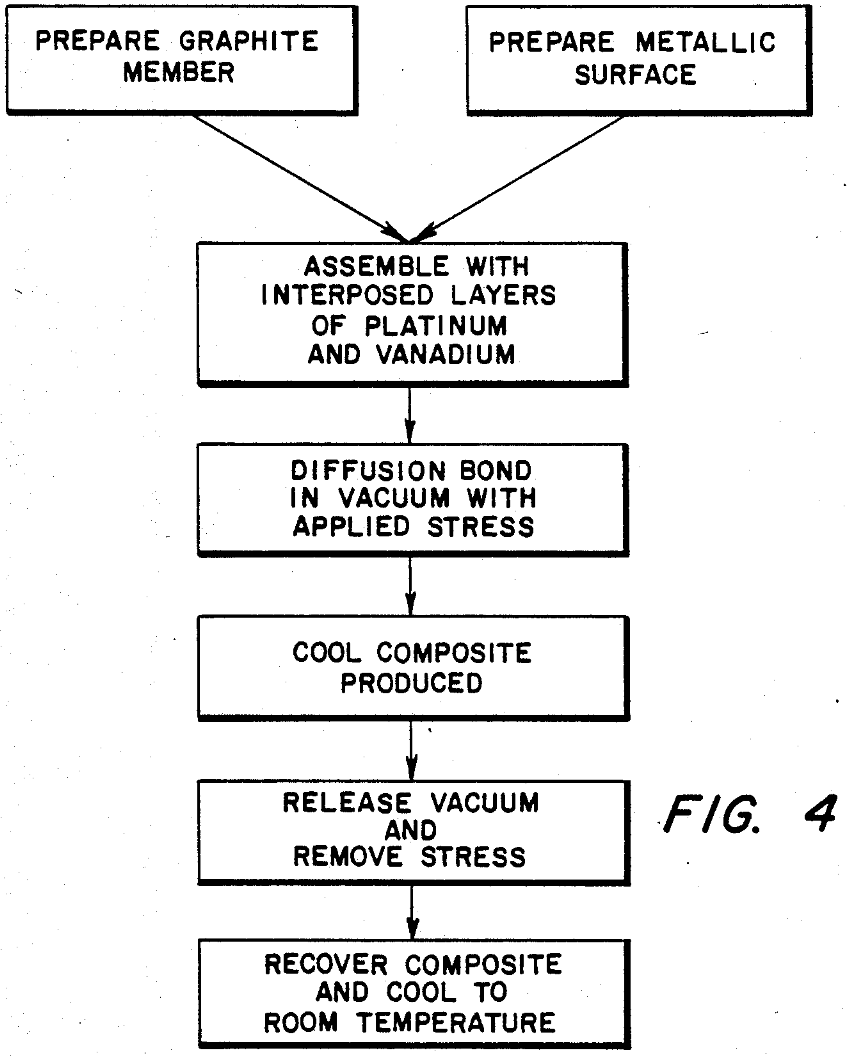
FIG. 4

COMPOSITE ROTARY ANODE FOR X-RAY TUBE AND PROCESS FOR PREPARING THE COMPOSITE

This application is a division, of application Ser. No. 702,160, filed Feb. 15, 1985, now U.S. Pat. No. 4,641,334.

BACKGROUND OF THE INVENTION

This application relates to three other patent applications directed to diffusion bonding processes for the preparation of composite high performance rotary anodes for X-ray tubes. These applications, which are incorporated by reference, are U.S. patent appplications Ser. No. 702,165 - Devine, Jr., filed, Feb. 15, 1985, Ser. No. 702,164 - Devine, Jr. filed Feb. 15, 1985 and Ser. No. 702,161 - Devine, Jr. filed Feb. 15, 1985.

Workers in the field of designing rotary anodes for conventional X-ray imaging systems have long recognized the advantages of utilizing graphite in such constructions. It soon became evident that in using graphite there also exists the danger that when a metallic surface of tungsten, tungsten alloys, molybdenum or molybdenum alloys is in direct contact with graphite, reactions between the metallic surface and the graphite (during manufacture of the rotary target and/or during use thereof to generate the X-ray beam) lead to the formation of a brittle intermediate carbide layer. The patent literature proposes various anode constructions as solutions to this problem, for example, U.S. Pat. Nos. 3,660,053; 3,719,854 and British Pat. Nos. 1,173,859; 1,207,648 and 1,247,244.

Another patent (U.S. Pat. No. 3,890,521) expresses concern with the formation of tungsten carbide by reaction between a graphite disc, or carrier, and the tungsten target layer while accepting the in situ formation of a carbide layer of tantalum (or presumably of hafnium, niobium or zirconium). The initial assembly of components consists of a graphite carrier upon which are successively deposited a first layer of iridium, osmium or ruthenium, a second layer of hafnium, niobium, tantalum or zirconium and then a target layer (e.g., tungsten). The desired layer of carbide (e.g., tantalum carbide) forms when, during operation of the X-ray tube, carbon diffuses across the first layer and reacts with the second layer. Both this patent and U.S. Pat. No. 3,710,170 are concerned with thermal stresses introduced in the rotary anode structure because of the difference in thermal expansion coefficients between tantalum carbide (U.S. Pat. No. '521) and the adjoining structure and between graphite (U.S. Pat. No. '170) and the adjoining structure. However, in the case of U.S. Pat. No. '170, as well as in U.S. Pat. No. '521, certain metal carbide content is deliberately employed as part of the solder material. For example, in U.S. Pat. No. '170 it is proposed that a molybdenum-molybdenum carbide eutectic be prepared by placing graphite in contact with molybdenum and heating to about 2200° C.

Still another concern is evident in British Pat. No. 1,383,557 wherein a solder layer of zirconium and/or titanium is employed to join graphite to molybdenum, tantalum or an alloy formed between two or more of tungsten, molybdenum, tantalum and rhenium. A carbide layer is formed between the graphite support and the solder layer. Particular temperature control and initial foil thickness are employed to insure survival of the solder layer.

The great variance in thought in the preceding prior art as to how to best join graphite to refractory metals, particularly tungsten, tungsten alloys, molybdenum and molybdenum alloys shows how complex this problem has remained in the design of rotary anodes for conventional X-ray apparatus.

These varied solutions to the extent they may be viable in conventional X-ray imaging systems, face a much more severe test in connection with the use of graphite members in X-ray tubes used in medical computerized axial tomography (C.A.T.) scanners. In the formation of images, a medical C.A.T. scanner typically requires an X-ray beam of from 2 to 8 seconds in duration. Such exposure times are much longer than the fractions-of-a-second exposure times typical for conventional X-ray imaging systems. As a result of these increased exposure times, much larger quantities of heat (generated as a by-product of the process of X-ray generation in the target region) must be stored and eventually dissipated by the rotating anode.

Graphite, which provides a low mass, high heat storage volume, remains a prime candidate, of course, for inclusion in rotating anode structures for C.A.T. scanner X-ray tubes, particularly when the graphite member functions as a heat sink from which heat is dissipated as radiant energy as is disclosed in U.S. Pat. Nos. 3,710,170 and Re. No. 31,568 rather than as support for the target anode layer.

One important consideration in the manufacture of a composite anode disc embodying a graphite member is the method by which the graphite is bonded to an adjacent tungsten, tungsten alloy, molybdenum or molybdenum alloy metallic surface. Formation of any brittle carbide layer is of particular concern, because of the propensity thereof for cracking. Cracking results in a reduction in heat flow from the metal surface to the adjacent graphite member and frequently will compromise the structural integrity of the anode.

In X-ray tubes used in C.A.T. scanners, the bulk temperatures of such anode reach temperatures of 1200°-1300° C. in operation. At such temperatures, tungsten, tungsten alloys, molybdenum or molybdenum alloys readily form the undesired metal carbide. Thus, it has been considered particularly important for such rotary anodes to devise a joining procedure and anode structure in which the metallic surface is not permitted to react with the graphite and, even more important, that provision is made in the composite anode structure to prevent reaction from occurring between the metallic surface and the graphite during operation of the C.A.T. scanner X-ray tube.

Three reissue patents (U.S. Pat. Nos. Re. 31,369; Re. 31,560 and Re. 31,568) issued to Thomas M. Devine, Jr., describe a brazing procedure in which a layer of platinum, palladium, rhodium, osmium, ruthenium or platinum-chromium alloy is interposed between the metallic surface and the graphite body to which it is to be joined. Although a brazed region develops above and below the interposed layer, this layer itself survives to function as a barrier to carbon diffusion during operation of the X-ray tube. The aforementioned braze materials are characterized by their ability to react with tungsten, tungsten alloys, molybdenum, molybdenum alloys and also with graphite. Because the reaction of the interposed layer with graphite can only proceed at a temperature in excess of the temperatures that are reached by the rotating anode in service, even at the maximum service temperatures an intermediate platinum layer, for example, will act as a diffusion barrier for carbon to prevent the passage thereof through the platinum, where it would be able to form the brittle tungsten or molybdenum carbide.

The use of alloys of platinum to join graphite to tungsten or tungsten alloy is disclosed in Gebrauchmuster No. 7,112,589 and the use of alloys containing platinum to join graphite to tungsten or molybdenum is disclosed in U.S. Pat. No. 3,442,006 (U.S. Pat. No. '006). In both of these inventions the process for joining requires that the intermediate layer be melted. An intermediate layer of any of the alloys proposed in U.S. Pat. No. '006 would fail as a diffusion barrier to carbon at X-ray anode operating temperatures.

Provided that the brazing in the practice of the aforementioned Devine inventions is accomplished quickly, formation of the objectionable carbide is avoided. At the brazing temperatures employed, which render the intermediate layer (e.g., platinum) molten, the intermediate molten layer can become saturated with carbon. By way of example, liquid platinum can, over a period of time at a temperature just above the eutectic temperature, dissolve up to about 16 atomic percent carbon. When tungsten or molybdenum is in contact with such a high carbon content liquid, carbide will form at the interface. The amount of time available for the carbon to dissolve in the liquefied braze layer is, therefore, important and if the assembly being brazed remains at a high temperature for too long a period of time, a thick layer of carbide can form, which layer is in danger of becoming cracked during cooling or handling. In the case of the use of platinum as the braze layer to affix molybdenum to graphite, a temperature exposure of about 1800° C. for as little as about 5 minutes will result in a layer of molybdenum carbide about 0.003 inch in thickness.

Therefore, in the practice of the process disclosed in the Devine reissue patents, if brazing capability is available at the manufacturing facility to provide fast ramping to brazing temperature, holding for a short time and then cooling to below 1400° C. in a brief time frame, carbide formation is avoided. However, such ideal heating arrangements, which are commercially available, may not be accessible and it may be necessary to use a larger furnace. A problem that will occur when a number of rotary anode discs (typically 4 or 5 inches in diameter) are processed simultaneously in a furnace of high thermal mass is that each such disc tends to stay hot for a relatively long period of time and thick, cracked layers of carbide can form. Consequently, as an alternative to the aforementioned brazing method, it would be desirable to have a joining technique and anode composition, which can tolerate having the anode discs spend a finite length of time (e.g., minutes) at the joining temperature (and thereby permit the use of furnaces of high thermal mass) and the rotary anodes produced from such composites will be able to render high quality performance in the rigorous environment of the C.A.T. scanner X-ray tube.

DESCRIPTION OF THE INVENTION

As was discovered in connection with the invention described in Ser. No. (702,165), whereas workers in the art have consistently sought to totally avoid the formation of brittle tungsten carbide or molybdenum carbide layers in the joint bonding a graphite body to a surface of tungsten, tungsten alloy, molybdenum or molybdenum alloy in a rotary anode, what is important is not the presence or absence of such carbide layers, but the thickness thereof and the assurance that such carbide layers will not increase in thickness during use of the composite.

By the use of diffusion bonding employing the temperatures, times and applied stresses defined herein, assemblies of molybdenum (or molybdenum alloys) -vanadium-platinum-graphite or tungsten (or tungsten alloys)-vanadi-um-platinum-graphite are converted to sound diffusion-bonded composites (useful in rotary anodes) in which a surviving continuous layer of platinum functions as an effective barrier to the transport of carbon at anode operating temperatures. The resulting compound laminate joint between the graphite and the molybdenum or tungsten includes in the joint a crack-free layer of carbide of molybdenum-vanadium or tungsten-vanadium metallurgically bonded to the adjoining surfaces, this carbide layer being less than about 3 microns in thickness. A molybdenum-vanadium carbide or tungsten-vanadium carbide layer of such thickness does not introduce defects such as would be the case with a carbide layer having a thickness of about 0.0007 inch (i.e., 17.8 microns) or greater. It is the control of carbide layer thickness afforded by the process of this invention that makes feasible the acceptability of the presence in a high performance rotary anode of a layer of tungsten-vanadium carbide or molybdenum-vanadium carbide, both of which are brittle materials.

Diffusion bonding conducted in an atmosphere inert to the assembled elements for about 4–5 minutes at temperatures ranging from about 1450° C. to 1550° C. (i.e., no melting of the platinum) with stress applied generally normal to the joining interfaces produces an overall sound composite structure even though the joint contains a very thin crackfree layer of molybdenum-vanadium carbide or tungsten-vanadium carbide. The applied stress should be of a magnitude at least sufficient to bring, and maintain, adjacent elements in intimate enough contact to enable atoms to diffuse across the interface. The requisite applied stress to achieve good bonding depends on the finishes of the mating surfaces of the members. The lower the stress employed, the smoother the mating surfaces should be. At an applied stress of 2000 psi, sound joints can be produced using the aforementioned times and temperatures without any need for special surface preparation. Also, in general, when using a platinum foil, the applied stress must be higher than when the platinum is electroplated as a layer over the graphite surface and within the graphite pores.

BRIEF DESCRIPTION OF THE DRAWINGS

The features of this invention believed to be novel and unobvious over the prior art are set forth with particularity in the appended claims. The invention itself, however, as to the organization, method of operation and objects and advantages thereof, may best be understood by reference to the following description taken in conjunction with the accompanying schematic drawings wherein:

FIG. 3 is an enlarged view of the joint between the graphite body and the molybdenum or tungsten component to show in greater detail the makeup of the compound laminate produced during the diffusion bonding and FIG. 4 is a flow diagram defining essential steps employed in the preferred mode for preparing the composite rotary anode constructions of this invention.

MANNER AND PROCESS FOR MAKING AND USING THE INVENTION

Figure 1:
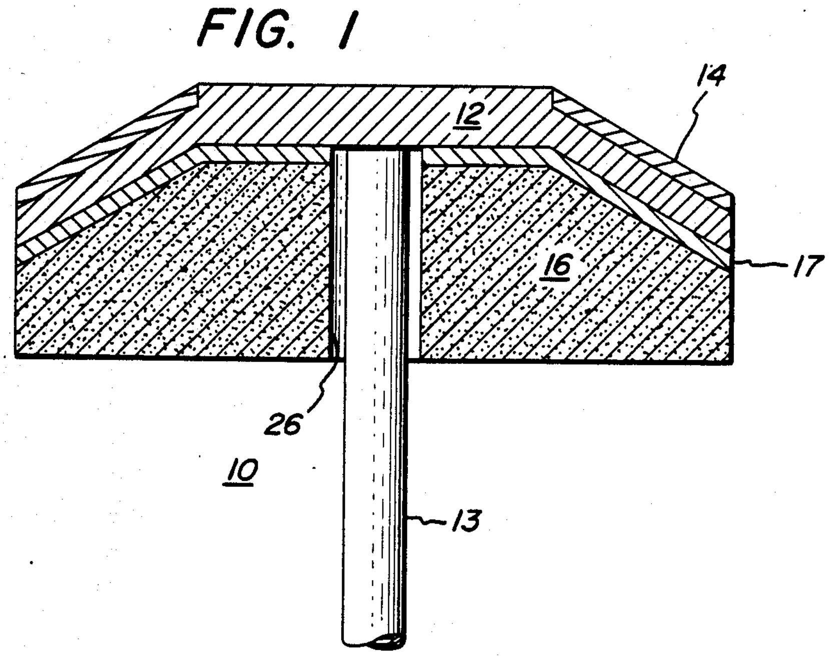
FIG. 1 is a view predominantly in cross-section of a composite rotary anode construction prepared in accordance with the process described herein.

Referring now to FIG. 1, there is shown a composite rotary anode 10 prepared by the method of this invention in which disc (also referred to as a support, or carrier) 12, preferably made of molybdenum or molybdenum alloy, is joined to stem 13 by brazing, welding, diffusion bonding and the like. Disc 12, which supports anode target 14 affixed to a selected surface area of the outer surface thereof, is diffusion bonded to graphite member 16 via the compound laminate 17 present in the completed structure. As is shown in FIG. 3, the compound laminate 17 is made up of, in sequence, a layer 21 of carbide having at least two metal components, a first being selected from the group consisting of molybdenum and tungsten and a second being vanadium; a layer 22 of metal selected from the group consisting of vanadium and vanadium alloys; interdiffused metals comprising platinum and vanadium and continuous layer 24 comprising platinum or platinum alloy. Each of these four laminae are metallurgically bonded to adjoining surfaces. Layers 24, 23 and 22 each contain small amounts of carbon dissolved therein. When the carbide layer is made up of a carbide of molybdenum and vanadium its composition would be represented as $[Mo(V)]_2C$, the vanadium content being low.

Because of the presence of platinum layer 24 in the completed assembly to function as a barrier to carbon diffusion, the thickness of carbide layer 21 does not increase during operation of the X-ray tube even under the conditions of operation of a medical C.A.T. scanner.

The relationships of temperature, time and applied stress for producing optimum composites are routinely determinable from the teachings set forth herein. Additional aspects useful in the optimization of the diffusion bond are component part surface finish, thickness of the platinum and vanadium layers, cleanliness and freedom from initial stress.

Graphite member 16 is provided with an aperture (the wall of which is designated by numeral 26) enabling stem 13 to be bonded directly to metal disc 12. Sufficient space is maintained between the surface of stem 13 and wall 26 of the graphite member to obviate the formation of carbides in the metal of stem 13.

The platinum metal used in the practice of this invention should have a purity of at least about 99.5%, this purity being commercially available. Such grades of platinum are soft and extremely ductile. Platinum alloys (i.e., platinum is the major constituent by weight) in which the alloying addition does not destroy the ability of the layer to function as a barrier to carbon transit during operation of the anode (e.g., platinum with 1% by weight chromium) may also be used. In addition, the alloying additive should not result in a carbide layer greater than about 3 micrometers in thickness using the process limitations of this invention. The ability of a given platinum alloy to meet these criteria can be routinely determined.

As has been noted above, vanadium alloys may be used in place of vanadium metal provided that the alloy has sufficient carbon solubility to be able to limit the thickness of carbide layer formed to less than about 3 micrometers.

The vanadium or vanadium alloy layer may be supplied as a foil or may be vapor deposited on the metal component being joined to the graphite body.

The total thickness of the initial layers of platinum (or platinum alloy) and vanadium (or vanadium alloy) should be in the range of from about 0.002" to about 0.004".

The material of anode target 14 typically comprises tungsten, an alloy of tungsten and rhenium, and the like. When the material of anode target 14 is an alloy of tungsten and rhenium, the rhenium content typically varies from 3 to 10 weight percent but may be as high as 25 weight percent.

Graphite member 16 contributes the favorable features of high heat storage and high heat dissipating capability. As shown, disc 12 is saucer-like in configuration and the matching surface of the heat sink, graphite member 16, is similarly contoured.

A powdered metallurgical technique may be employed to form disc 12 and anode target 14 as a unit. In such case, a predetermined amount of the powder metal material provided to constitute the anode target 14 is placed in a die. The molybdenum (or molybdenum alloy, tungsten or tungsten alloy) powder to constitute disc 12 is then added to the die and the powder metals are compressed to form a unified green compact. The green compact is then sintered and hot forged to produce the disc/target combined structure. It is at this point in the manufacturing process that graphite member 16 is diffusion bonded to the underside of support disc 12 as described herein. Thereafter, stem 13 is joined to disc 12 by inertia welding, brazing, diffusion bonding and the like. The stem material is preferably columbium or a columbium alloy. Preferably stem 13 is hollow to reduce heat conduction along its length.

Figure 2:
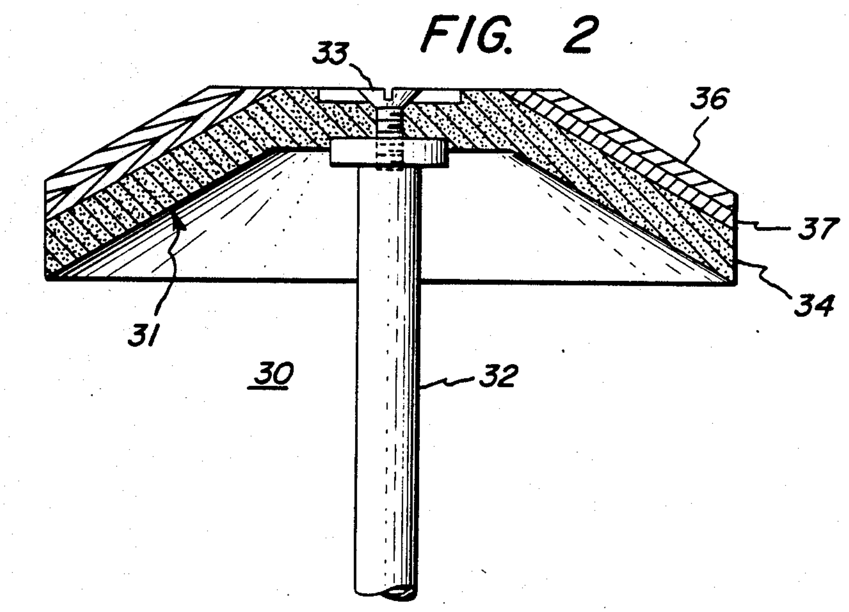
FIG. 2 is a view in cross-section in large part of another embodiment of a composite rotary anode construction prepared according to the process of this invention.

A second configuration of a composite rotary anode employing a graphite member is shown in FIG. 2. The completed composite rotating anode 30 includes a disc assembly 31 joined to stem 32 by means of screw assembly 33. Disc assembly 31 comprises the saucer-like configured graphite disc 34 and preformed annular shaped anode target 36 diffusion bonded thereto via the compound laminate 37. Compound laminate 37 in the completed composite has the construction described for compound laminate 17 in FIG. 3 (i.e., layer 21, layer 22, zone 23 and layer 24) having the compositions generally described hereinabove, but in which the metal to which the graphite is to be bonded is tungsten or a tungsten alloy.

The platinum or platinum alloy layer may be provided in the form of a foil, preferably about 0.002 inch thick, by electroplating or vapor depositing (e.g., sputtering) the platinum on the graphite. Further, platinum foil may be used in combination with a platinum layer provided by either of the other deposition processes. If such multiple layers of platinum or platinum alloy are used, they become metallurgically bonded together during the diffusion bonding step but are distinguishable as layers, because of differences in microstructure.

The target anode 36 of tungsten or tungsten-rhenium alloy is joined to the graphite substrate 34 by positioning target 36 over graphite member 34 with the platinum and vanadium or vanadium alloy layers disposed therebetween. These component elements are urged into close abutting contact by the application of stress thereto to enable the diffusion of atoms across the interfaces during the subsequent diffusion bonding, which is preferably conducted in vacuum. Other inert atmospheres, such as hydrogen or argon can be used.

The process of joining the graphite member to a metallic surface [either the metal disc 12 (FIG. 1 embodiment) or the metal target layer 36 (FIG. 2 embodiment)] according to this invention is briefly outlined in the flow diagram of FIG. 4.

Various preparatory steps may be taken in the preparation of (a) the graphite member, (b) the metallic surface, (c) the layer of platinum or platinum alloy and (d) the layer of vanadium or vanadium alloy. Thus, in the case of the graphite, in addition to the forming thereof in the desired shape, the graphite body may be subjected to ultrasonic cleaning and/or thermal shock. In the case of the metallic surface of tungsten, tungsten alloy, molybdenum or molybdenum alloy, the component presenting this metallic surface may be subjected to stress relief anneal, etching and/or ultrasonic cleaning in an organic solvent. The exposed surface of electroplated (or vapor deposited) platinum or platinum alloy and/or vapor deposited vanadium or vanadium alloy may require improved surface finish to insure adequate contact with the metallic surface. Such improved contact may be obtained by grinding and polishing or by lap finishing the surface(s).

After the graphite member and metallic surface have been prepared for assembly they are disposed in a "sandwich" arrangement with at least one layer of platinum or platinum alloy (e.g., a platinum foil, an electroplated layer of platinum or a combination of electroplated platinum with a platinum disc) and a layer of vanadium or vanadium alloy (e.g., as a foil) therebetween. The assembled components are placed in a heating chamber in which a vacuum can be drawn. Stress is applied to the assembly to urge the components of the assembly into intimate contact, the extent of applied stress depending upon the surface finishes of the mating parts. The vacuum is now drawn. The assembled components, while under the applied stress, are heated, preferably by radiation, in the vacuum environment to the desired temperature for the preselected period of time. This constitutes the diffusion bonding process. After completion of the diffusion bonding step, the heating is stopped and the sample is permitted to cool. When the temperature of the unified composite reaches approximately 300° C., air can be admitted to the chamber, the stress on the diffusion-bonded composite is reduced to zero and the composite is removed and permitted to cool to room temperature (i.e., about 68°-72° F.).

Table I displays the results of a diffusion bonding test conducted on a molybdenum alloy-vanadium-platinum-carbon assembly to produce a diffusion-bonded composite. The platinum and vanadium were supplied in the form of 0.002" thick foils. The molybdenum alloy was one containing about 0.5 w/o of titanium and about 0.1 w/o of zirconium.

TABLE I

| Test Sample | Temp (°C.) | Hold Time | Time to Reach Temp. | Time to Cool to 1400° C. | Applied Stress (psi) | Mo or TZM | Mo or TZM Etched? | Mo or TZM Stress Relieved at 1650° C./ ½hr? | Comment |
|---|---|---|---|---|---|---|---|---|---|
| CC | 1487 ± 12° | 4 min | 13 min | 1½ min | 2000 | TZM | Yes | Yes | V layer between Pt and Mo; carbide present. |

Improved results in the diffusion bonding can be obtained by subjecting the molybdenum or molybdenum alloy component to stress relief annealing in vacuum at 1650° C. for about half an hour and/or etching by direct immersion for 30 seconds in a solution of 12 gm KOH+12 gm $K_3Fe(CN)_6$ per 100 ml. of $H_2O$ to remove surface oxide scale. Just prior to assembly and diffusion bonding it is preferred to subject all component elements to ultra-sonic cleaning in acetone for several minutes.

Diffusion bonding was performed inside a cylindrically-shaped vacuum chamber measuring 24 inches in diameter by 21 inches in height. Samples were heated by radiation emitted from a graphite susceptor (⅜in. thick ×4½in. high ×4 in. inside diameter) which was inductively heated. Assemblies to be diffusion bonded were placed on a graphite block which extended 1½ inches up inside of the graphite susceptor. Assembly temperatures were measured optically. Stresses were applied to the assemblies either by means of a hydraulic ram, which entered through a water-cooled O-ring seal at the top of the vacuum chamber, or by placing molybdenum and/or graphite weights on top of the assembly. In a typical test the desired stress was first applied to the sample, the chamber was then pumped down to a pressure of ~100μ, and 20 kW of power was passed through the copper induction coil. Once the assembly reached the desired temperature, the power was reduced to maintain an approximately constant temperature in the assembly for a given period of time. After the assembly was at temperature for the desired length of hold time, power to the induction coil was shut off. The sample was allowed to cool for 1 hour, at which point its temperature was approximately 300° C. Air was admitted into the chamber, the stress on the assembly was reduced to zero and the unified assembly was removed and permitted to cool to room temperature. To inspect the joint for soundness the sample was then sectioned in half longitudinally and the sectioned surface was metallographically polished and etched. The joint was adjudged sound.

It was initially thought that vanadium would function to prevent carbon from reaching the molybdenum or tungsten component, because of its high solubility for carbon relative to the solubility of molybdenum or tungsten for carbon. As the data in Table I attests, vanadium was unable to prevent the formation of carbide. However, the layer of molybdenum-vanadium carbide formed was crack-free and only about 2 microns in thickness. As such this layer did not compromise the integrity of the joint.

A combination of optical microscopy and energy dispersive X-ray analysis were employed and it was determined thereby that intermetallic phases of vanadium-platinum were present.

In summary, the tabulated results indicate that TZM (and thereby molybdenum) can be diffusion bonded to graphite using intermediate layers of platinum and vanadium to produce a sound composite structure in which a crack-free layer of $[Mo(V)]_2C$ of predetermined maximum thickness is formed but the formation of additional carbide during operation of the X-ray anode is prevented. The carbide is brittle and by analogy to $Mo_2C$ would appear to be highly susceptible to cracking when present as a layer thicker than $\sim 0.7 \times 10^{-3}$ in. If bonding temperatures in the range of 1450° C.-1550° C. for 4-5 minutes are used, the thickness of carbide layer 21 will be kept to less than about 3 micrometers. The applied stress required for good bond depends on the surface finishes of mating parts. The lower the stress used, the smoother the mating surfaces must be. At an applied stress of 2000 psi, sound joints can be produced without any need for special surface preparation. With an 8-10 root mean square (RMS) finish on the platinum and metal surfaces, good bonding can be achieved with an applied stress of only 5 psi. Porosity of the graphite results in its rough surface. In order to insure bonding over the entire graphite surface contiguous with the platinum layer, a high stress (about 2000 psi) should be applied when a 0.002 inch thick platinum foil or vanadium foil is used. If a low stress is to be used, the platinum layer should be electroplated onto the graphite in order to fill the graphite pores. As an alternative method, the platinum may be deposited by vapor deposition, such as vacuum sputtering.

When graphite is to be diffusion bonded to tungsten or tungsten alloys instead of molybdenum or molybdenum alloys, the temperature/time/applied stress relationships described herein are equally applicable.

In claiming this invention reference to a layer of a metal or alloy thereof shall be understood to encompass either a single layer or contiguous multiple layers thereof, because the function remains the same for the multiple layers as for the single layer.

What is claimed is:

1. The process for joining mating surfaces of a graphite member and a metal component by diffusion bonding during preparation of an anode assembly for a rotary X-ray anode, the metal of said metal component being selected from the group consisting of tungsten, tungsten alloys, molybdenum and molybdenum alloys, said process comprising the steps of:

(a) assembling a sequence of elements in a chamber, the assembled elements comprising (1) said graphite member, (2) at least one continuous layer of first metal selected from the group consisting of platinum and platinum alloys, (3) a continuous layer of second metal selected from the group consisting of vanadium and vanadium alloys and (4) said metal component, said mating surfaces being in juxtaposition;

(b) applying a stress to said assembled elements sufficient to to urge each of said elements into intimate contact with any adjacent element so as to enable the diffusion of atoms to occur therebetween;

(c) providing an atmosphere in said chamber inert to said assembled elements;

(d) heating said assembled elements while under stress to a temperature in the range of from about 1450° C. to about 1550° C.;

(e) holding said assembled elements under stress at said temperature for a period of from about 4 to about 5 minutes during which time a crack-free layer of carbide comprising carbide of vanadium and carbide of metal from said metal component forms and said assembled elements are unified;

(f) ceasing the heating to permit the unified assembled elements to cool and (g) recovering said unified assembled elements.

2. The process of claim 1 wherein the applied stress is in the range of about 5 to about 2000 psi.

3. The process of claim 1 wherein the first metal is a platinum foil about 0.002 inch in thickness.

4. The process of claim 1 wherein the graphite member is subjected to thermal shock prior to assembly.

5. The process of claim 4 wherein a layer of platinum is deposited by electrodeposition on the mating surface of the graphite member.

6. The process of claim 5 wherein the outer surface of the layer of platinum is subjected to mechanical abrasion to render it more smooth.

7. The process of claim 6 wherein the surface is ground to a 600 grit finish.

8. The process of claim 1 wherein a layer of platinum is deposited by electrodeposition on the mating surface of the graphite member.

9. The process of claim 8 wherein the contiguous surfaces of the layer of platinum and the mating surface of the metal component are provided with a surface roughness of 8-10 RMS.

10. The process of claim 1 wherein the second metal is vapor deposited on the mating surface of the metal component.

11. The process of claim 1 wherein the metal component is etched prior to assembly to remove oxide scale from its mating surface.

12. The process of claim 1 wherein the elements to be assembled are ultra-sonically cleaned in an organic solvent.

13. The process of claim 1 wherein the heating is accomplished by radiant heating.

14. The process of claim 1 wherein the inert atmosphere is created by evacuation of the chamber.

15. The process of claim 1 wherein the inert atmosphere is an argon environment.

16. The process of claim 1 wherein the inert atmosphere is a hydrogen environment.

17. The process of claim 1 wherein the first metal is vapor deposited on the graphite member.

* * * * *